June 7, 1960

G. F. MANGANARO ET AL 2,939,933

TIME-DELAY RELAY

Filed Dec. 11, 1957

INVENTOR.
ROBERT H. BURKE
GEORGE F. MANGANARO
BY:

ATTORNEY

June 7, 1960 G. F. MANGANARO ET AL 2,939,933
TIME-DELAY RELAY
Filed Dec. 11, 1957 3 Sheets-Sheet 2

INVENTOR.
ROBERT H. BURKE
GEORGE F. MANGANARO
BY:
ATTORNEY

June 7, 1960　　　G. F. MANGANARO ET AL　　　2,939,933
TIME-DELAY RELAY

Filed Dec. 11, 1957　　　　　　　　　　　3 Sheets-Sheet 3

INVENTOR.
ROBERT H. BURKE
GEORGE F. MANGANARO
BY
ATTORNEY

United States Patent Office 2,939,933
Patented June 7, 1960

2,939,933
TIME-DELAY RELAY

George F. Manganaro, 78 Glen Ridge Ave., Montclair, N.J., and Robert H. Burke, 94 N. 19th St., East Orange, N.J.

Filed Dec. 11, 1957, Ser. No. 702,179

2 Claims. (Cl. 200—122)

This invention relates to an improvement in a time-delay relay, and its object is to provide in such a relay improved contact operating means actuated by expansion of a thermally expansible member.

Another object is to provide uniformity and accuracy to delay time in thermal action relays subject to varying voltages.

A further object is to provide precision means for adjusting the operation of a time-delay relay.

A still further object is to permit such a device to be economically produced.

Other objects and advantages of this invention will appear in the description which follows.

Heretofore, most thermal action relays have been designed to compensate for voltage changes by balancing mass of metal and the heat generated. This has not been very practical due to the lengthening of recovery time, a factor that is very important. With our invention a minimum amount of metal may be employed to give the quickest possible recovery time.

Referring to the figures in which the same reference number refers to the same or a similar part:

While the drawings illustrate five different forms of time-delay relays, each embodies this invention as will be seen from the description hereinafter given.

Figures 1, 2, 3, 4, 5 and 7, illustrate one form of time-delay relay which embodies this invention. In this form the linear expansion of a contact arm of the relay closes contact points and thus the circuit.

Figure 2:
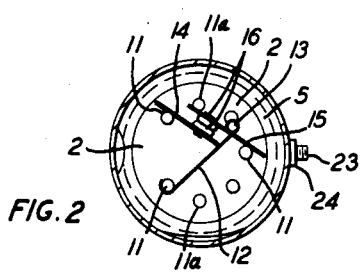
Figure 2 is a top view of the relay of Figure 1, the outer shell being in section.
Figure 1:
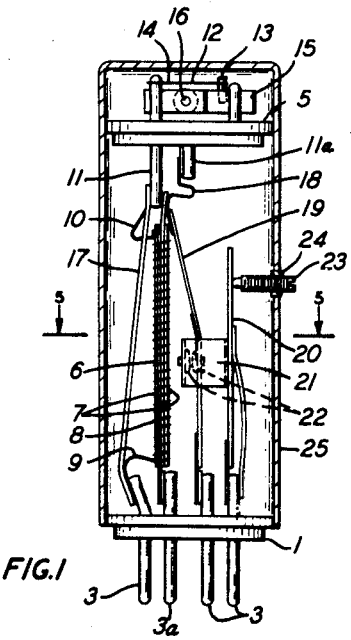
Figure 1 is a side elevational view of one form of time-delay relay embodying this invention, the outer shell being in section.
Figure 4:
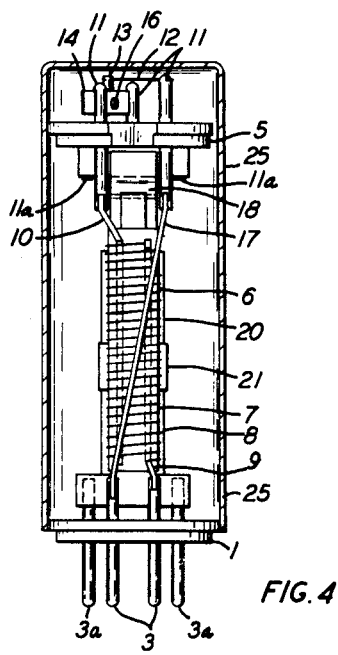
Figure 4 is a side elevational view of the relay of Figure 1, rotated 90 degrees from the position shown therein, the outer shell being in section.

Referring to the elevational views of Figures 1 and 4, the time-delay relay is enclosed in an outer shell 25 and is supported upon base 1, downwardly from which extend conductor pins 3 and support pins 3a. Within outer shell 25, header 5 divides the interior into a lower and an upper compartment. The main portion of the relay is housed in the lower compartment, the upper compartment housing the voltage compensator.

Figure 3:
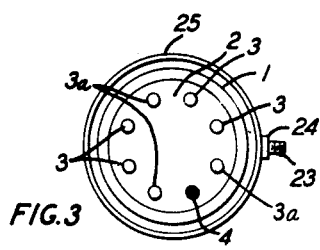
Figure 3 is a bottom view of the relay of Figure 1.

In detail, base 1 has a central circular area 2 of insulating material, through which conductor pins 3 and support pins 3a pass and within which locating pin 4 is anchored. Pins 3 are electrical conductors and serve to make the electrical connections between the relay and the external circuits. Pins 3a are supporting pins to secure and hold in place the lower end of heater assembly 6. Pin 4 shown cut off in Figure 3 is merely a locating pin to facilitate the insertion of the relay into an appropriate receptacle; such receptacle not being illustrated in the drawings.

Header 5 is of similar construction to base 1 and through it extend electrical conductor pins 11. Conductor pins 11 provide electrical connection between the main portion of the relay and the compensator unit mounted on header 5. Support pins 11a projecting downward from header 5 hold resilient metallic member 18 and thus the upper end of heater assembly 6.

Figure 5:
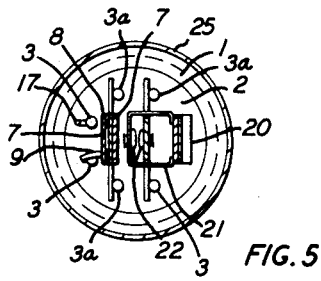
Figure 5 is a sectional view along line 5—5 of Figure 1.
Figure 7:
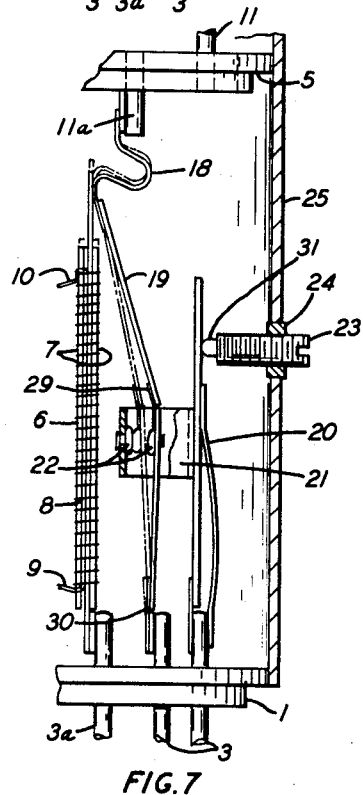
Figure 7 is an enlarged partial view of Figure 1, illustrating the open and closed positions of the contact making elements.

Referring to Figure 1, extending upward from base 1 is adjustable contact arm 20 upon which is mounted bracket 21 having attached to it one of two contacts 22. The construction of bracket 21 and the location of contact 22 upon it is best seen in Figure 5. Adjustable contact arm 20, mounted at one end upon a conductor pin 3, is adjustable by means of screw 23 threaded in bushing 24 which is secured in the side wall of outer shell 25. Screw 23 is provided with a tip 31 of insulating material which is shown in Figure 7.

Parallel in part to adjustable arm 20 is movable contact arm 19, mounted upon a conductor pin 3. Movable contact arm 19 has attached to it contact 22 positioned to close on contact 22 of adjustable contact arm 20. The upper end of movable contact arm 19 is secured to a resilient metallic member 18, which is also secured to the upper end of heater assembly 6 and to the bottoms of support pins 11a. Movable contact arm 19 is formed of two metallic pieces joined by hinge 29 to permit flexure of the arm at this point. It should be noted that the lower end of movable arm 19 is joined to a conductor pin 3 by a resilient metallic member 30. This construction permits the flexing of contact arm 19.

Adjacent to movable contact arm 19 and in position to heat it is heater assembly 6 which is attached to a support pin 3a at its lower end and to resilient metallic member 18 at its upper end. Surrounding insulating members 7 of heater assembly 6 is resistance wire 8. It will be observed, particularly from Figure 4, that from a conductor pin 3, wire 9 leads to one end of resistance wire 8, while wire 10 leads from the other end to a conductor pin 11, projecting downward from heater 5. From another conductor pin 3, wire 17 connects with another conductor pin 11.

Turning to the structure above header 5, it will be noted that contacts 16 in opposition to each other are respectively mounted on a fixed contact arm 14 supported on a conductor pin 11 and on a movable contact arm 15 supported on another conductor pin 11. These contacts are normally closed. Resistance wire 12 is anchored at one end on a third conductor pin 11, and at its other end upon a short pin 13 attached to movable contact arm 15.

Figure 15:
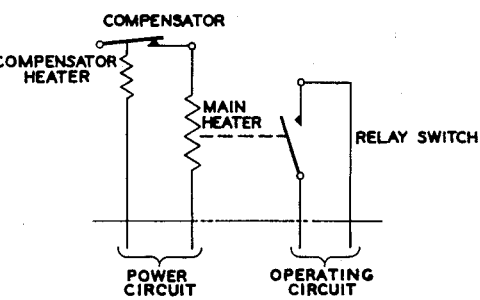
Figure 15 is a wiring diagram basic to each form of relay shown in the preceding figures.

Referring to Figure 15 the operation of the foregoing described form of time-delay relay is made clear. From the power circuit current passes through a conductor pin 3, wire 9, resistance wire 8 (main heater), wire 10, a conductor pin 11, resistance wire 12 (compensator heater), short pin 13, movable contact arm 15, contacts 16, fixed contact arm 14 (the last named three denoted in Figure 15 as "compensator") a conductor pin 11, wire 17 and thence completing the power circuit by way of a conductor pin 3. The heat of the heater assembly 6 (main heater) elongates it and tends to straighten contact arm 19 which brings contacts 22 together, thus closing the relay switch and completing the operating circuit which in the relay starts with the conductor pin 3 connected with adjustable contact arm 20 and ends with the conductor pin 3 connected with movable contact arm 19.

The positioning of the parts of the main portion of the relay before and after the influence of heater assembly 6 is shown in Figure 7, the broken lines showing the position of movable contact arm 19 and resilient metallic member 18 when heat has been applied and contacts 22 closed.

The function of resistance wire 12 is to lengthen under a predetermined excess voltage in the power circuit to open contacts 16 when such excess is present, and thus cut off the flow of current through heater assembly 6. Contraction of resistance wire 12 will again close contacts 16 and restore current through heater assembly 6. If desired, spring members may be associated with movable contact arm 15 to prevent "sticking" of the contacts 16 and thus to furnish a more precise functioning.

Figure 6:
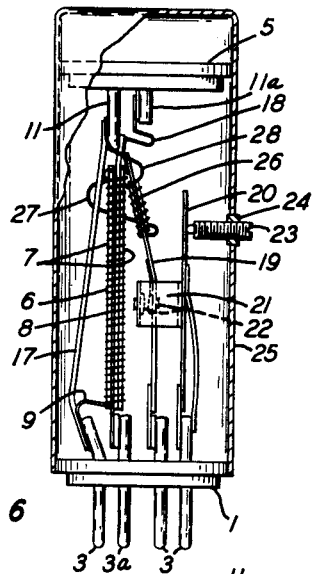
Figure 6 is a view similar to Figure 1 and of the relay shown therein modified to be without a separate voltage compensator unit.

Figure 6 illustrates a modification wherein the separate voltage compensator is dispensed with but the same results are secured by the addition of a heating element to the movable contact arm 19. In this modification, auxiliary heater 26 is mounted on the upper half of movable contact arm 19 and is inserted in the power circuit with heater 6 by wires 27 and 28. In this form the imposition of a predetermined excess voltage in the relay will cause auxiliary heater 26 to lengthen arm 19 and thus to retard the straighten out of arm 19 and thereby offset, in part, the action of heater 6 upon it.

Figure 9:
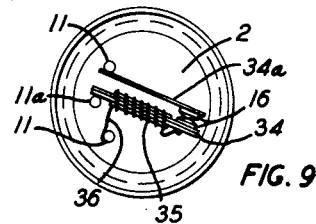
Figure 9 is a top view of the relay of Figure 8, the top of the outer shell removed.
Figure 8:
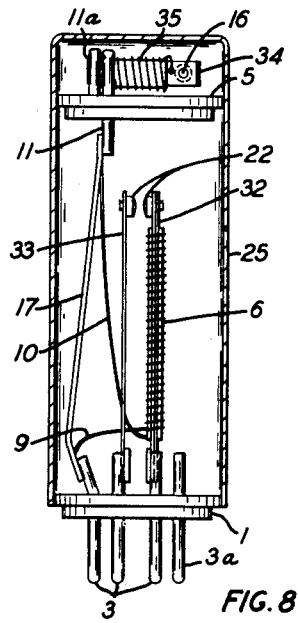
Figure 8 is a side elevational view similar to Figure 1, but of still another modification.

Figures 8 and 9 illustrate another modification and in this time-delay delay a bi-metal contact arm is employed rather than the linearly expanded contact arm. In this form as seen from Figure 8, heater 6 is mounted on bi-metal contact arm 32 at the free end of which is a contact 22. Mounted in operable relation to bi-metal contact arm 32 is contact arm 33 at the free end of which is a contact 22. Arms 32 and 33 and contacts 22, when closed, are in the operating circuits.

Above header 5 is the voltage compensator which consists of a miniature of the main contact features of the relay, with contacts closed, however, unless an excess voltage is present in the power circuit. Heater 35 is mounted on bi-metal contact arm 34, attached at one end to a support pin 11a, which, under the influence of the heater may open contacts 16. Heater 35 is placed in the power circuit by wire 17, conductor pin 11, connection 36, arm 34, contacts 16, fixed contact arm 34a, conductor pin 11, which acts as a support for arm 34a, wire 10, heater 6 and wire 9.

Figure 11:
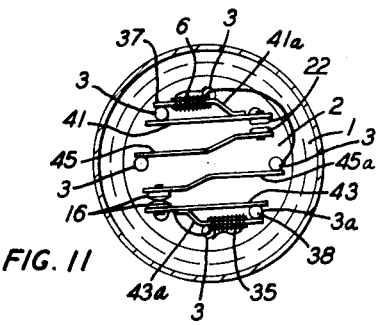
Figure 11 is a top view of the relay of Figure 10, the outer shell in section.
Figure 10:
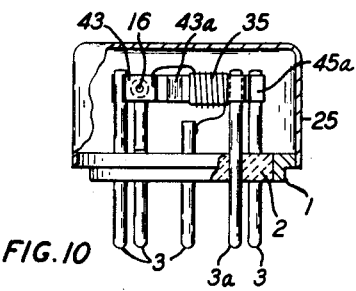
Figure 10 is a side elevational view partially in section of a miniature time-delay relay.
Figure 12:
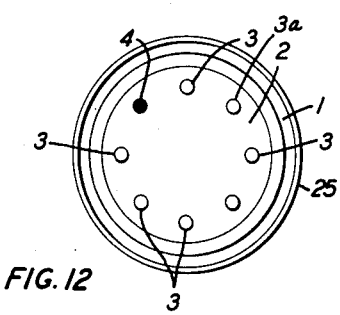
Figure 12 is a top view of the base of Figure 10.

Figures 10, 11 and 12 are a miniature form of the time-delay relay illustrated in Figure 1. In this form it will be noted that all of the members are contained in a single compartment formed by outer shell 25 mounted on base 1. Relay 37 and compensator 38 are combined in this compartment. Relay 37 consists of forked arms 41 and 41a, mounted on a conductor pin 3 and fixed arm 45 mounted on another conductor pin 3. Opposing contacts 22, normally open, are mounted at the free ends of arms 41 and 45. Heater 6 is mounted on arm 41a.

Compensator 38 consists of forked arms 43 and 43a, mounted on support pin 3a and fixed arm 45a, mounted on a conductor pin 3. Opposing contacts 16, normally closed are mounted at the free ends of arms 43 and 45a. Heater 35 is mounted on arm 43a.

The operating circuit includes arms 41 and 45 and contacts 22 when closed.

The power circuit includes heater 6, arm 45, contacts 16, arm 43 and heater 35.

Heater 35 under excess voltage in the power circuit, will cause contacts 16 to open and thus cut off current in heater 6.

Figure 14:
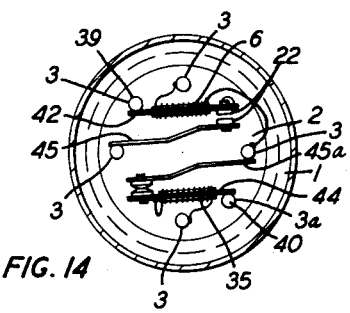
Figure 14 is a top view of the relay of Figure 13, the outer shell being in section.
Figure 13:
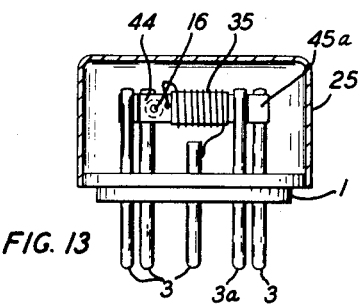
Figure 13 is a side elevational view of another miniature time-delay relay, the outer shell being in section.

Figures 13 and 14 are a miniaturization of the time-delay relay shown in Figure 8. In this form bi-metal relay 39 is subject to the control of bi-metal voltage compensator 40.

Relay 39 consists of bi-metal arm 42, mounted on a conductor pin 3 and fixed arm 45, mounted on another conductor pin 3. Opposing contacts 22, normally open, are mounted at the free ends of arms 42 and 45. Heater 6 is mounted on bi-metal arm 42.

Compensator 40 consists of bi-metal arm 44, mounted on support pin 3a and fixed arm 45, mounted on a conductor pin 3. Opposing contacts 16, normally closed, are mounted at the free ends of arms 44 and 45. Heater 35 is mounted on bi-metal arm 44.

The operating circuit includes arms 42 and 45, and contacts 22 when closed.

The power circuit includes heater 6, arm 45, contacts 16, arm 44 and heater 35.

Excess voltage in the power circuit will cause heater 35 to open contacts 16 and cut off power to heater 6.

It is obvious that many modifications may be made and the several types of thermal contacts interchanged. For example, a bi-metal arm may be used in the main portion of the relay and a linear expandable arm in the compensator or vice versa. Furthermore, it is possible to so design a relay member using this invention so that it will operate only when a certain voltage is reached. The required design of wire sizes and lengths will be readily recognized by those skilled in the art. Other modifications are equally possible not only with the use of different members in combination, but the substitution of materials and certain parts. We do not, therefore, limit ourselves to the illustrations given herein.

What we claim is:

1. A time-delay relay comprising a base; a casing mounted on the base; a header attached within the casing a spaced distance from the base; an elongated thermally expansible member mounted at one end upon the base; an electrical resistance heating element mounted in cooperation therewith; an elongated member, hinged in the middle, mounted at one end upon the base and in bent relation to the expansible member connected at its other end to the free end of the expansible member; a first contact mounted on the hinge member; a second contact supported from the base, mounted in adjustable and cooperative relation with the first contact; a pair of cooperating third and fourth contacts in circuit with the electrical resistance heating element mounted on top of the header on spring arms urging the contacts apart; an electrical resistance wire in circuit with the electrical resistance heating element holding the said contacts in closed position and adapted under a predetermined voltage in the circuit to permit the contacts to open.

2. A time-delay relay comprising a base; a casing mounted on the base; a header attached within the casing a spaced distance from the base; an elongated thermally expansible member mounted at one end upon the base; an electrical resistance heating element mounted in cooperation therewith; an elongated member, hinged in the middle, mounted at one end upon the base and in bent condition to the expansible member connected at its other end to the free end of the expansible member; a first contact mounted on the hinge member; a second contact supported from the base, mounted in adjustable and cooperative relation with the first contact; a second elongated thermally expansible member mounted on and above the header; a second electrical resistance heating element in circuit with the first one mounted in cooperation with the second expansible member; and a third and a fourth contact in circuit with both electrical resistance heating elements and in contact with each other, one of such contacts being mounted on the second expansible member and adapted to be separated therefrom under a predetermined voltage in the circuit.

References Cited in the file of this patent

UNITED STATES PATENTS

| | | |
|---|---|---|
| 1,297,945 | Warden et al. | Mar. 18, 1919 |
| 2,169,989 | Pearce | Aug. 15, 1939 |
| 2,255,672 | Mason | Sept. 9, 1941 |
| 2,388,564 | Osterheld | Nov. 6, 1945 |
| 2,664,483 | Broekhuysen | Dec. 29, 1953 |
| 2,700,084 | Broekhuysen | Jan. 18, 1955 |
| 2,809,253 | Broekhuysen | Oct. 8, 1957 |

FOREIGN PATENTS

| | | |
|---|---|---|
| 21,540 | Great Britain | Sept. 21, 1912 |
| 20,085 | Great Britain | Sept. 5, 1913 |